United States Patent [19]

Federman et al.

[11] Patent Number: 5,174,887

[45] Date of Patent: Dec. 29, 1992

[54] HIGH SPEED ELECTROPLATING OF TINPLATE

[75] Inventors: George A. Federman, East Northport; Donald W. Thomson, Northport; Michael P. Toben, Smithtown; Neil D. Brown, Baldwin, all of N.Y.

[73] Assignee: Learonal, Inc., Freeport, N.Y.

[21] Appl. No.: 517,788

[22] Filed: May 2, 1990

Related U.S. Application Data

[63] Continuation-in-part of Ser. No. 409,914, Sep. 20, 1989, Pat. No. 4,994,155, which is a continuation-in-part of Ser. No. 282,581, Dec. 9, 1988, Pat. No. 4,880,507, which is a continuation-in-part of Ser. No. 130,759, Dec. 10, 1987, abandoned.

[51] Int. Cl.⁵ .................... C25D 3/32; C25D 3/36; C25D 3/60
[52] U.S. Cl. .................... 205/253; 205/299; 205/302
[58] Field of Search .................... 204/44.4, 54.1; 205/300, 301, 302, 303, 299, 253

[56] References Cited

U.S. PATENT DOCUMENTS

| | | |
|---|---|---|
| 905,837 | 12/1908 | Broadwell . |
| 1,947,652 | 2/1934 | Langedijk .................... 260/11 |
| 2,147,415 | 2/1939 | Tucker .................... 204/1 |
| 2,174,507 | 9/1939 | Tinker et al. .................... 260/513 |
| 2,187,338 | 1/1940 | Werntz .................... 260/513 |
| 2,195,409 | 4/1940 | Flett .................... 204/1 |
| 2,398,426 | 4/1946 | Hanford .................... 260/513 |
| 2,401,428 | 6/1946 | Kosmin .................... 204/49 |
| 2,460,252 | 1/1949 | DuRose et al. .................... 204/44.4 |
| 2,525,942 | 10/1950 | Proell .................... 204/45 |
| 3,082,157 | 3/1963 | Francisco et al. .................... 204/54 |
| 3,361,652 | 1/1968 | Korplun et al. .................... 204/54 |
| 3,429,790 | 2/1969 | Schoot et al. .................... 204/54 |
| 3,577,328 | 5/1971 | Rynne .................... 204/54 |
| 3,661,730 | 5/1972 | Nishihara .................... 204/43 |
| 3,694,329 | 9/1972 | Kam .................... 204/54 R |
| 3,730,853 | 5/1973 | Sedlacek et al. .................... 204/43 |
| 3,749,649 | 7/1973 | Valayil .................... 204/43 S |
| 3,769,182 | 10/1973 | Beckwith .................... 204/43 S |
| 3,785,939 | 1/1974 | Hsu .................... 204/43 S |
| 3,819,502 | 6/1974 | Meuldijk et al. .................... 204/206 |

(List continued on next page.)

FOREIGN PATENT DOCUMENTS

| | | |
|---|---|---|
| 122265 | 9/1976 | Fed. Rep. of Germany . |
| 63-161183 | 7/1988 | Japan . |
| 63-161184 | 7/1988 | Japan . |
| 63-161185 | 7/1988 | Japan . |
| 63-161186 | 7/1988 | Japan . |
| 63-161187 | 7/1988 | Japan . |
| 63-162894 | 7/1988 | Japan . |
| 555929 | 9/1943 | United Kingdom . |
| 1151460 | 5/1969 | United Kingdom . |

OTHER PUBLICATIONS

Federman, G and Brown, N "An Alternative Tinplate Electrolyte".
Clausius, R. A "Material Testing of National Steel/Hoogovens Tin Plate" National Steel Corp technical paper.

(List continued on next page.)

Primary Examiner—John Niebling
Assistant Examiner—Brian M. Bolam
Attorney, Agent, or Firm—Pennie & Edmonds

[57] ABSTRACT

A process for depositing tin upon a steel strip by high speed electroplating to produce tinplate, which includes a basis solution of an alkyl sulfonic acid, a solution soluble tin compound and a surfactant, preferably of an alkylene oxide condensation compound of 1) an aliphatic hydrocarbon having seven, preferably six or less, carbon atoms and at least one hydroxy group, or 2) an organic compound having no more than a total of twenty carbon atoms in one or two independent or joined rings optionally substituted with an alkyl moiety of six carbon atoms or less. After electroplating, the tinplate is rinsed and the rinse water only needs to be treated for removal of tin ions prior to discharge by normal procedures.

24 Claims, 1 Drawing Sheet

U.S. PATENT DOCUMENTS

| | | | |
|---|---|---|---|
| 3,860,502 | 1/1975 | Johnson | 204/54.1 |
| 3,875,029 | 4/1975 | Rosenberg et al. | 204/44.4 |
| 3,905,878 | 9/1975 | Dohi et al. | 204/43 S |
| 3,926,749 | 12/1975 | Passel | 204/43 S |
| 3,956,123 | 5/1976 | Rosenberg et al. | 204/54 R |
| 3,977,949 | 8/1976 | Rosenberg | 204/54 R |
| 4,000,047 | 12/1976 | Ostrow et al. | 204/43 S |
| 4,053,372 | 10/1977 | Davis | 204/43 S |
| 4,061,547 | 12/1977 | Rosenberg | 204/54 R |
| 4,072,582 | 2/1978 | Rosenberg | 204/54 R |
| 4,132,610 | 1/1979 | Dohi et al. | 204/43 S |
| 4,139,425 | 2/1979 | Eckles et al. | 204/43 S |
| 4,242,182 | 12/1980 | Popescu | 204/54 R |
| 4,270,990 | 6/1981 | Fong | 204/55 R |
| 4,384,930 | 5/1983 | Eckles | 204/43 S |
| 4,388,158 | 6/1983 | Inui et al. | 204/27 |
| 4,459,185 | 7/1984 | Obata et al. | 204/43 S |
| 4,565,609 | 1/1986 | Nobel et al. | 204/44.4 |
| 4,565,610 | 1/1986 | Nobel et al. | 204/44.4 |
| 4,582,576 | 4/1986 | Opaskar et al. | 204/44.4 |
| 4,599,149 | 7/1986 | Nobel et al. | 204/44.4 |
| 4,617,097 | 10/1986 | Nobel et al. | 240/44.4 |
| 4,662,999 | 5/1987 | Opaskar et al. | 204/44.4 |
| 4,673,470 | 6/1987 | Obata et al. | 204/44.4 |
| 4,701,244 | 10/1987 | Nobel et al. | 204/44.4 |
| 4,717,460 | 1/1988 | Nobel et al. | 204/44.4 |
| 4,871,429 | 10/1989 | Nobel et al. | 204/44.4 |
| 4,880,507 | 11/1989 | Toben et al. | 204/44.4 |

OTHER PUBLICATIONS

Hoogovens "The Netherlands Try Out LeaRonal Tinning Electrolyte-Ronastan vs Ferrostan", Report, C. Saito letter/personal communication to G. Federman.

Dohi, *Bright Solder Plate, Metal Finish*, Oct., 1966, pp. 62–63.

Hagen Wettwer, "Continuous Plating of Copper, Nickel, and Chromium on Wide Steel Strip for Decorative and Functional Applications", (1977).

J. J. Miles et al., "Swim Plating as a Continuous Process," (1977).

Charles D. Eidschun, "How to Save Gold with Selective Deposits", (1977).

M. Morimoto et al., "High-Speed Electrogalvanizing Line with Insoluable Anode at Kimitsu Works of Nippon Steel Corp.", (1977).

Dohi et al. "Electrodeposition of Bright Tin-Lead Alloys" Interfinish 80 (1980).

Hoare, et al., "The Technology of Tin Plate," St. Martins Press, New York, 1965, Chapter 8, pp. 213–263.

Dohi et al., Bright Solder and Indium Plating From Methane Sulfonic Acid, Showa 53, Jul. 1978.

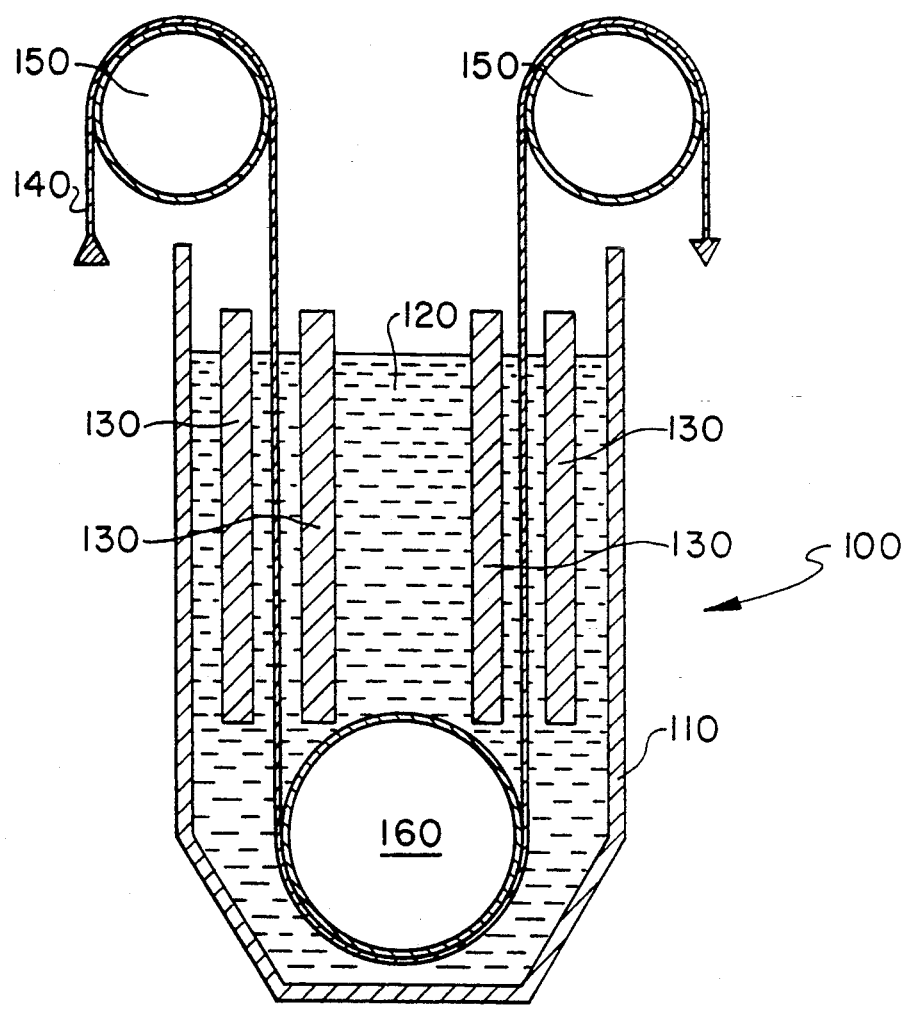

HIGH SPEED ELECTROPLATING OF TINPLATE

CROSS REFERENCE TO RELATED APPLICATIONS

This application is a continuation-in-part of application Ser. No. 07/409,914, filed Sep. 20, 1989, now U.S. Pat. No. 4,994,155, which is a continuation-in-part of application Ser. No. 07/282,581, filed Dec. 9, 1988, now U.S. Pat. No. 4,880,507, which is a continuation-in-part of application Ser. No. 07/130,759, filed Dec. 10, 1987, now abandoned.

TECHNICAL FIELD

This invention relates to a method for producing tinplate by electroplating tin onto steel strip from alkyl sulfonic acid based electrolytes.

BACKGROUND OF THE INVENTION

Electroplating baths for depositing tin, lead, or their alloys have been used for many years in electroplating equipment. High speed electroplating equipment and processes are well-known in the industry and generally consist of directing the work to be plated into the electroplating cell from one end, allowing the work to proceed through the electroplating cell and exit thereafter the cell at the other end. The electroplating solution is removed or overflows the electroplating cell into a reservoir and the solution is pumped from the reservoir back into the electroplating cell to provide vigorous agitation and solution circulation. Many variations of these electroplating cells can exist, but the general features are as described.

There are a number of desirable features that the electroplating solution should possess for improved operation in this type of equipment or processing, as follows:

1. The solution must be able to electroplate the desired deposit at the high speeds required.

2. The solution must deposit tin of sufficient purity and grain characteristics to enable a bright reflective deposit to be obtained by reflow, i.e., by heating the tinplate above the melting point of tin and quenching the tinplate into water.

3. The solution should be stable and the additives must withstand exposure to the strong acid solution as well as to the introduction of air which would take place as a result of the vigorous solution movement in high speed plating machines.

4. The solution should remain clear and free from turbidity, even at elevated temperatures such as 120°-130° F. or higher. Due to the high current densities involved and relatively low solution volumes, these baths tend to heat up in high speed electroplating equipment until the solution reaches equilibrium at an elevated temperature. The additives used must be of a type that will not turn the solution turbid at such elevated temperatures.

5. Because of vigorous solution movement and solution mixing with air, there is a strong tendency to produce a foam which is detrimental to the electroplating process. Under extreme conditions, this foam can build up in the reservoir tank with resultant overflow onto the floor, thereby losing a large quantity of solution to the waste stream. Foam can also interfere with the operation of the pump that is being used to generate agitation. Arcing between the anode and cathode is also possible due to the presence of foam. Because of these problems, the additives used should not generate foam in the plating equipment.

Many electrolytes have been proposed for electroplating tin, lead, and tin/lead alloys and one of these is described in U.S. Pat. No. 4,701,244. This patent discloses the electroplating of tin, lead or tin/lead alloys from lower alkyl sulfonic acid baths which contain brightening additives as well as many wetting agents of various types. Surfactants claimed to be useful are betaines, alkylene oxide polymers, imidazolinium compounds, quaternary ammonium compounds, ethylene oxide derivatives of amines, phosphonates, amides and many others. U.S. Pat. No. 4,662,999 discloses an electroplating bath for electrodeposition of tin, lead, or tin/lead alloys from alkane or alkanol sulfonic acid baths that also contain surfactants plus other additives. In this patent, the surfactant can be non-ionic, cationic, anionic or amphoteric. A great many examples are given for the various types of surfactants and the patent enumerates a large number of the various types of wetting agents which can be used.

U.S. Pat. No. 4,673,470 describes a tin, lead, or tin/lead alloy plating bath based upon an aliphatic or aromatic sulfocarboxylic acid. Instead of the alkene or alkanol sulfonic acids disclosed in previous patents, this patent includes a carboxylic acid radical in the organic sulfonic acid compound. The electroplating baths described contain brightening agents plus a surface active agent, with particular emphasis on those surface active agents that are non-ionic. A very broad group of non-ionic surface active agents as described as being useful, and many different wetting agents are recited.

The electrolytic tinning of steel strip to produce tinplate is well known in the art. A detailed summary of this process is described in a book by W. E. Hoare, et al., entitled "The Technology of Tinplate," St. Martin's Press, New York, 1965. Typical plating units are described in Chapter 8, pages 223-252.

Although various types of alkaline and acid electrolytes have been utilized to deposit tinplate, current technology primarily utilizes the sulfate based electrolytes which also contain phenolsulfonic acid for this application. Waste disposal from these baths is difficult, since they contain poisonous materials that are harmful to the environment. Other baths contain fluorides, borates and other environmentally unsafe components.

SUMMARY OF THE INVENTION

The invention relates to a method for producing tinplate by depositing tin upon steel strip under high speed electroplating conditions. In this method, an electrolyte comprising a basis solution of an alkyl sulfonic acid, a solution soluble tin compound, and a surfactant is utilized. The surfactant is preferably one which is substantially non-foaming under the high speed electroplating conditions. Preferably, the surfactant is an alkylene oxide condensation compound of an aliphatic hydrocarbon having between one and seven, and preferably less than six, carbon atoms and at least one hydroxy group, or solution soluble derivatives thereof. In addition, preferred surfactants impart to the solution a cloud point of above about 110° F. When bright deposits are desired, the electrolyte may also include a brightening agent.

One preferred surfactant is an alkylene oxide condensate of an alcohol, such as butyl alcohol. Also, to achieve the desired cloud point, the alkylene oxide compound may be ethylene oxide wherein between about four and 40 moles of ethylene oxide, and preferably between six and twenty-eight, are used to form the condensation compound. Some of the moles of ethylene oxide may be replaced with propylene oxide.

Another suitable surfactant is an alkylene oxide condensation compound of an aromatic organic compound having 20 carbon atoms or less; or solution soluble derivatives thereof. This aromatic compound may preferably contain one or two rings, preferably containing between 10 and 12 carbon atoms when two rings are utilized. Also, the aromatic organic compound may include an alkyl moeity of six carbon atoms or less, and one or more hydroxyl groups. Preferably, the aromatic organic compound is phenol, bisphenol A, styrenated phenol, or an alkylated derivative thereof. Also, benzene, naphthalene and toluene, each having at least one hydroxy group, or alkylated derivatives thereof, may likewise be used.

Therefore, the most preferred surfactants include a organic compound having 20 carbon atoms or less condensed with a sufficient amount of an alkylene oxide compound or solution soluble derivatives thereof to impart a cloud point of above 110° F. to the solution.

The method is carried out in high speed electroplating equipment of the type described above. Such equipment includes an electroplating cell, an overflow reservoir adjacent the cell, a pump for returning solution from the reservoir to the cell through one or more sparge pipes, and means for directing the steel strip to be plated from an entry point at one end of the cell to an exit at a second end of the cell. The electrolytes of the invention are introduced into the equipment in a manner such that the cell is substantially filled with the electrolyte. Also, the electrolyte continuously overflows into the reservoir and is continuously returned into the cell so that vigorous agitation and circulation of the electrolyte within the cell is achieved. Thus, the steel strip is continuously electroplated as it passes through the cell.

BRIEF DESCRIPTION OF THE DRAWING

A cross-sectional view of an electroplating cell for depositing tin on steel strip is presented herein.

DETAILED DESCRIPTION OF THE INVENTION

The tin electroplating compositions that are described herein are specifically designed to deposit acceptable matte or bright deposits from electrolytes that are suitable for operation at high speeds in modern high speed electroplating equipment for producing tinplate. Only a limited number of such wetting agents can satisfy all the requirements listed above for optimum high speed electroplating in a clear solution without generating foam or tin sludge. These compounds comprise relatively low molecular weight ethylene oxide derivatives of aliphatic alcohols containing an alkyl group of less than eight carbon atoms or ethylene oxide derivatives of aromatic alcohols containing a maximum of two aromatic rings which may be alkyl substituted providing the alkyl grouping contains less than six carbon atoms and including is compounds again provided that the alkyl grouping contains less than six carbon atoms. The aromatic compound, whether alkylated or not, should not contain more than 20 carbon atoms prior to condensation with the alkylene oxide compound.

The sulfonic acids that are suitable for this invention include any alkyl sulfonic acid having up to 5 carbon atoms. The alkane sulfonic acids, and in particular methane sulfonic acid, are preferred. These acids are generally present in an amount of between 5 and 30 percent by volume of the electrolyte, so that free acid is present. As such, the pH of the electrolyte will be 2 or less, usually less than 0.5.

Any suitable solution soluble divalent tin compound can be utilized as an initial source of tin in the bath. Thereafter, the pure tin anodes act as a source to replenish divalent tin during electrolysis. It is also possible to utilize anodes which are made of an insoluble material, such as platinum, iridium, other platinum metals or their oxides. For this arrangement, the divalent tin compound is added to the bath from an external source as is known in the art.

The surface active agents that are suitable for this invention are those that satisfy all of the listed above requirements, namely: those which help produce deposits having a matte or lustrous finish with satisfactory grain refinement and reflow characteristics; and wherein the solution is stable in the acid bath, capable of electroplating under high speed conditions, has a cloud point above about 110° F., and generates little or no foam during the electroplating operation.

Foaming is determined in the laboratory by using a basis solution that is typical of those used in high speed electroplating machines. The solution contains the following:

Tin metal (as tin methane sulfonate): 20 g/l
Methane sulfonic acid: 15% by volume
Surface active agent under test: 1% by volume
Temperature: ambient to 75° F.

The relative degree to which the surface active agents form foam in the basis solution is tested by placing 100 ml of the solution into a 250 ml graduated cylinder.

Air is supplied by a commercial laboratory or fish tank aerator and fed into the bottom of the solution in the graduated cylinder through a sparger. Two tests are performed: the first one requires pumping air for two minutes to determine if the foam height exceeds 150 ml or goes over the top of the graduated cylinder. If it does, the surface active agent is considered unsuitable and no further work is done. The second test involves bubbling air into a fresh solution for ten seconds. At the end of ten seconds, the maximum foam height is read on the graduated cylinder and a time for foam to completely dissipate down to the original 100 ml mark is noted. In order for a surfactant to pass such a test, the maximum foam height should not exceed 150 ml, and the time for foam to dissipate should not exceed 20 seconds.

Cloud point is measured by taking the basis solution containing 1% of the surface active agent and slowly raising the temperature until the solution begins to turn cloudy. A cloud point above approximately 120° F. is highly satisfactory: those 110° F. or below are generally found to be unsatisfactory.

The basis solution for use in high speed electroplating equipment and processes of this invention generally contains relatively high concentrations of metals and acid. Such high concentrations also affect the cloud point of the electrolytes. For example, a surfactant which would impart a high cloud point to dilute electrolytes may impart a low cloud point to these concentrated electrolytes. Therefore, it is important to determine the cloud point for the specific overall electrolyte that is contemplated for electroplating the desired deposit.

In addition, under high speed electroplating conditions, the rapid pumping action and solution movement causes air to be mixed with the solution, thereby providing a source for oxidation of divalent tin to the tetravalent state, which tends to precipitate in the bath as stannic oxide. It is this oxide that forms tin sludge with a corresponding loss of available tin for electrodeposition. The sludge also reduces the efficiency of the bath and causes operating problems because of its tendency to clog the jets and spargers of the agitation system. This, in turn, results in frequent and costly production shutdowns for cleanup and removal.

To reduce or minimize the formation of tetravalent tin under the particular high speed electroplating conditions used herein, a small amount of a hydroxyphenyl compound may be included in the electrolyte as an antioxidant or reducing agent. Suitable hydroxyphenyl compounds are disclosed in U.S. Pat. No. 4,871,429, the disclosure of which is expressly incorporated herein by reference thereto. The most preferred antioxidants are the position isomers of dihydroxy benzene, i.e., resorcinol, catechol and hydroquinone.

By "high speed electroplating," applicants mean those processes which operate at a current density above 75 ASF and above a temperature of about 85° F. in the above-described equipment. Preferably, such processes are carried out at current densities of 500 ASF or above and at temperatures of 95° F. or above. Temperatures of between 120° and 140° F. and current densities as high as 1500 to 2000 ASF or more are not uncommon for such processes.

The high speed electroplating characteristics and deposit grain refinement potential of the solution are determined in a Hull cell operated at 2 amps total current for 3 minutes at 120° F., with paddle agitation. The solution contains:

Tin metal (as tin methane sulfonate):20 g/l
Total methane sulfonic acid: 5% by volume
Surfactant: 1-10 ml/l, as required.

Under these conditions, the Hull cell panel should show a deposit with no more than 1" of burn in the high current density area and the deposit on the balance of the panel should be matte or somewhat lustrous, with a pleasing grey, smooth finish.

The stability of the electrolyte containing the surfactant is determined by electrolyzing the bath for at least 20 ampere hours per liter. The characteristics of the electroplating solution and its deposit should not have been effected by electrolysis.

The surface active agents that are included in this invention all include a hydrophobic organic compound which is condensed with a sufficient amount of an alkylene oxide, preferably ethylene oxide, to satisfy the requirements of high cloud point, stability, and high current density grain refinement. Propylene oxide can also be included with the ethylene oxide; however, the amount of propylene oxide used and its ratio to ethylene oxide use must be such that the cloud point is still high enough to pass the above requirements. Propylene oxide can be included to reduce the foaming characteristics of a surfactant; however, only a limited amount can be used since propylene oxide also lowers the cloud point of the resultant electrolyte. One skilled in the art can easily determine the amount of propylene oxide by routine testing.

The organic compound can be any aliphatic hydrocarbon (saturated or unsaturated) of seven carbon atoms or less containing at least one hydroxy group. Similarly, the organic compound can also be an aromatic ring compound such as benzene, naphthalene, phenol, toluene, bisphenol A, styrenated phenol, and the like, providing there is not more than two rings and the length of the substituted alkyl chain is limited to six carbon atoms or less. For benzene, napthalene and toluene, the compound would contain at least one hydroxyl group to facilitate condensation with the alkylene oxide compound. Also, the aromatic ring of any of these compounds can be substituted with one or more additional hydroxyl groups. Furthermore, the organic compound may include nitrogen, sulfur or oxygen atoms or moeities containing same as long as they do not deleteriously affect the solubility of the surfactant or its ability to provide the desired performance.

As an illustration of specific compounds, octylphenol ethoxylate with 12 moles of ethylene oxide would not be suitable for this invention because its foaming characteristics are too great due to the alkyl chain length being too great. Beta-naphthol with 13 moles of ethylene oxide, is suitable for this invention and is capable of passing all of the requirements. Styrenated phenol with two or more moles of styrene condensed with 12 moles of ethylene oxide is not suitable since it has three aromatic rings. Ethyloxylated bisphenol A is also suitable for this invention and is capable of passing all of the above requirements. This compound has two aromatic rings and three alkyl carbon atoms.

Other suitable surfactants for this invention can include ethoxylated butyl alcohol, with or without propylene oxide. As the chain length of the aliphatic alcohol is increased, the foaming characteristics will also increase. The foaming characteristics in this group of compounds can be decreased considerably by the inclusion of some propylene oxide into the molecule. However, this must be controlled to prevent the lowering of the cloud point, which would make the compound unsuitable if the resultant cloud point is less than 110° F. The maximum length of the alkyl group should be eight carbon atoms or less in this series.

In this invention, the plating bath contains solution soluble tin, preferably as alkyl sulfonates or alkanol sulfonates, plus some extra or free alkane or alkanol sulfonic acid. The surfactants suitable for this invention have been described in order to produce suitable deposits which are matte or semi-lustrous: however, it is also possible to improve the brightness of the deposit by adding known brightening agents such as those disclosed in any of the prior art patents listed earlier. The resultant plating bath will then have all of the desirable characteristics of a bright or semi-bright deposit.

The surface active agents can be rendered more solution soluble by techniques generally known in the art. Such solution soluble derivatives of the desirable surface active agents can be made, e.g., by sulfating, sulfonating, phosphating, phosphonating, carboxylating, etc., provided the derivative does not impair the suitability of the material for purposes of this invention stated previously.

There are a wide variety of high speed electroplating equipment commercially available today. One typical apparatus is disclosed in the Hoare et al. text mentioned above, and would utilize an electroplating cell as shown in the attached drawing figure. This cell 100 includes a tank 110 for retaining the electrolyte 120 therein and tin anodes 130 for supplying tin to the electrolyte. Steel strip 140 passes around a conductor roll 150 and downwardly into the cell 110 between tin anodes 130. As the strip 140 passes downwardly between the anodes 130, a tin coating begins to deposit thereon. Thereafter, strip 140 passes around sink roll 160 located near the bottom of the cell 100 and then passes upwardly between additional anodes 130 for receiving additional tin deposition before exiting the cell. Thereafter, strip 140 passes around another conductor roll 150 and into an adjacent cell. A plurality of such cells are utilized in a tin-plate production machine to deposit the appropriate amount of tin coating on the steel strip.

Although not shown in the figure, the plating electrolyte is continuously circulated between the system and a storage tank. The solution is primarily pumped into the bottom of each cell except for a small amount which is utilized to wet the top of the strip. The solution in each cell is maintained at the appropriate level by the use of an overflow at the entry end of the cell. Solution collected from the overflow is directed to the storage tank for recirculation.

After exiting the last cell, the strip passes through electrolyte recovery and rinsing stations. Recovered electrolyte is directed to the storage tank for recirculation. Rinsing is conducted in a second tank by a system of hot water sprays and wringer rolls. Finally, the tinplate is dried by passing through an air dryer to complete the electroplating operation. When a bright deposit is desired, the tinplate is subject to conventional reflow processing.

The rinsing water is collected for treatment and discharge. Tin ions must be removed by neutralization from this solution prior to discharge, but the remaining components, primarily the alkyl sulfonate salt and surfactant, can be discharged in a normal manner without further treatment, since these components are not harmful to the environment. This is an important advantage for the present process compared to those of the prior art.

EXAMPLES

The scope of the invention is further described in connection with the following examples which are set forth for the sole purpose of illustrating the preferred embodiments of the invention and which are not to be construed as limiting the scope of the invention in any manner.

Two stock solutions were used in each example to test the ability of each surfactant to electroplate pure tin. These solutions were as follows:

|  | A | B |
|---|---|---|
| Tin metal (as tin methane sulfonate) g/l | 20 | 72 |
| Methane sulfonic acid (vol. %) | 5 | 15 |

The surfactants of each example were added in increments until the optimum amount was reached. Tests of the solutions and the electrodeposits were made using all the test methods listed above:
1) foaming
2) cloud point of solution
3) grain refinement (smooth, light grey satin finish)
4) deposit reflow capability
5) speed of electroplating
6) stability of solution Each of the solutions of these examples exhibited a pH of less than 1, and was tested in a Hull cell at 2 amps.

EXAMPLE 1

Bisphenol A with 8 moles ethylene oxide was used in an amount of between 6 and 12 ml/l. The solutions with this surfactant passed all six tests.

EXAMPLE 2

Bisphenol A with 10 moles ethylene oxide was used in the same amounts as in Example 1. Solutions with this surfactant, also passed all tests.

EXAMPLE 3

Sulfated Bisphenol A with 30 moles ethylene oxide was used in an amount of between 3 and 6 ml. Solutions with this surfactant also passed all tests.

EXAMPLE 4

Beta Naphthol with 13 moles ethylene oxide was used in an amount of between 0.5 and 1 ml. Solutions with this surfactant also passed all tests.

EXAMPLE 5

Comparative

Polystyrenated phenol with 12 moles ethylene oxide was used in an amount between 3 and 6 ml/l. This surfactant forms too much foam and is not satisfactory despite that it passed the other tests.

EXAMPLE 6

Comparative

Octyl alcohol with 12 moles ethylene oxide was used in an amount of between 3 and 8 ml/l. This surfactant forms too much foam and is not satisfactory.

EXAMPLE 7

Comparative

Butyl alcohol with 5 moles ethylene oxide was used in an amount of between 2 and 8 ml/l. Although, the grain refinement of the deposit is not satisfactory, the other tests were passed: thus, the number of moles of ethylene oxide must be increased to at least six or more, as shown by Examples 8 and 9.

EXAMPLE 8

Butyl alcohol With 16 moles ethylene oxide plus 12 moles propylene oxide was used in an amount of between 1 and 4 ml/l. Solutions with this surfactant passed all tests.

EXAMPLE 9

Butyl alcohol with 8 moles ethylene oxide plus 6 moles propylene oxide was used in an amount of between 0.5 and 2 ml/l. Solutions with this surfactant passed all tests.

EXAMPLE 10

Bright deposits can be obtained by adding known brighteners such as aromatic aldehydes such as chlorobenzaldehyde or derivatives thereof, such as benzal acetone, to any of the above solutions that pass all the tests.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

We claim:

1. A method for producing tinplate which comprises:
   utilizing high speed electroplating equipment comprising an electroplating cell; an overflow reservoir adjacent said cell; means for returning solution from said reservoir to said electroplating cell; and means for directing a steel strip to be plated from an entry point at one end of said cell to an exit at a second end of said cell;
   introducing an electrolyte comprising a basis solution of an alkyl sulfonic acid, a solution soluble tin compound and a surfactant which is substantially non-foaming under high speed electroplating conditions into said equipment in a manner such that the electrolyte substantially fills said cell, continuously overflows into said reservoir, and is continuously returned to said cell, so as to provide vigorous agitation and circulation of said electrolyte within said cell; and
   continuously electroplating said steel strip with tin at a sufficient current density and at a sufficient temperature for high speed electroplating as said steel strip passes through said electroplating solution within said cell, wherein the surfactant is an alkylene oxide condensation compound of an organic compound having at least one hydroxy group and 20 carbon atoms or less, said organic compound including one of an aliphatic hydrocarbon of between one and seven carbon atoms; an unsubstituted aromatic compound; or an alkylated aromatic compound having six carbon atoms or less in the alkyl moiety.

2. The method of claim 1 wherein said means for returning said electrolyte to said cell comprises a pump.

3. The method of claim 1 wherein the aromatic compound is phenol, bisphenol A, or styrenated phenol, optionally including an alkyl moiety having six carbons atoms or less.

4. The method of claim 1 wherein the aromatic compound is benzene, napthalene or toluene, each having at least one hydroxyl group.

5. The method of claim 1 wherein the solubility of the surfactant in the electrolyte is increased by sulfating, sulfonating, phosphating, phosphonating or carboxylating the condensation compound.

6. The method of claim 1 wherein the alkylene oxide compound is ethylene oxide and wherein between 4 and 40 moles of oxide are used to form the condensation compound.

7. The method of claim 6 wherein some of the moles of ethylene, oxide are replaced with propylene oxide.

8. The method of claim 1 wherein the surfactant imparts to the solution a cloud point of above 110° F.

9. The method of claim 1 which further comprises producing a bright tin electrodeposit by including a brightening agent in said electrolyte.

10. The method of claim 1 which further comprises washing the plated steel strip with water after electroplating.

11. The method of claim 9 further comprising treating the water from the washing step to remove tin ions therefrom prior to discharge.

12. The method of claim 1 which further comprises reducing the amount of tin oxide sludge generated during electroplating by including an antioxidant in the electrolyte.

13. The method of claim 12 wherein the antioxidant is a hydroxyphenyl compound.

14. A method for producing tinplate which comprises:
   utilizing high speed electroplating equipment comprising an electroplating cell; an overflow reservoir adjacent said cell; means for returning solution from said reservoir to said electroplating cell; and means for directing a steel strip to be plated from an entry point at one end of said cell to an exit at a second end of said cell; and
   introducing an electrolyte comprising a basis solution of an alkyl sulfonic acid, a solution soluble tin compound, and a surfactant of organic compound having at least one hydroxyl group and 20 carbon atoms or less condensed with a sufficient amount of an alkylene oxide compound, or solution soluble derivatives thereof, said surfactant enabling the electrolyte to be substantially non-foaming, clear, free from turbidity, and stable under high speed electroplating conditions so as to provide smooth electrodeposits having a grey satin finish, said organic compound including one of an aliphyatic hydrocarbon of between one and seven carbon atoms; an unsubstituted aromatic compound; or an alkylated aromatic compound having six carbons or less in the alkyl moiety into said equipment in a manner such that the electrolyte substantially fills said cell, continuously overflows into said reservoir and is continuously returned to said cell, so as to provide vigorous agitation and circulation of said electrolyte within said cell; and
   continuously electroplating said steel strip with tin at a current density of at least 75 about ASF and at a temperature of at least about 85° F. for high speed electroplating as said steel strip passes through said electroplating solution within said cell.

15. The method of claim 14 wherein the cell includes a plurality of tin anodes and wherein the divalent tin compound is supplied by the anodes.

16. The method of claim 14 wherein the cell includes a plurality of insoluble anodes and the divalent tin compound is supplied from an external source.

17. The method of claim 14 which further comprises reducing the amount of tin oxide sludge generated during electroplating by including an antioxidant in the electrolyte.

18. The method of claim 17 wherein the antioxidant is a hydroxyphenyl compound.

19. The method of claim 14 which further comprises washing the plated steel strip with water after electroplating.

20. The method of claim 19 further comprising treating the water from the washing step to remove tin ions therefrom prior to discharge.

21. An electrolyte for depositing tin, lead or tin/lead alloys upon a substrate by high speed electroplating which comprises:
   a basis solution of an alkyl sulfonic acid; at least one of a solution soluble tin compound or a solution soluble lead compound; and a surfactant of organic compound having at least one hydroxyl group and 20 carbon atoms or less condensed with an alkylene oxide compound, or solution soluble derivatives thereof, said organic compound including one of an aliphatic hydrocarbon of between one and seven carbon atoms; an unsubstituted aromatic compound; or an alkylated aromatic compound having 6 carbon atoms or less in the alkyl moiety.

22. The electrolyte of claim 21 wherein the alkylene oxide used to form the condensation compound is ethylene oxide and wherein about 4 and 40 moles of ethylene oxide are used to form the condensation compound.

23. The electrolyte of claim 21 wherein the surfactant imparts a cloud point of above about 110° F. to electrolyte.

24. The electrolyte of claim 21 further comprising a brightening agent.

* * * * *